(12) United States Patent
Oestergaard

(10) Patent No.: US 10,512,244 B2
(45) Date of Patent: Dec. 24, 2019

(54) POULTRY BEDDING

(71) Applicants: Jacob Oestergaard, Jerslev (DK); Kaj Oestergaard, Jerslev (DK)

(72) Inventor: Jacob Oestergaard, Jerslev (DK)

( * ) Notice: Subject to any disclaimer, the term of this patent is extended or adjusted under 35 U.S.C. 154(b) by 547 days.

(21) Appl. No.: 15/307,528

(22) PCT Filed: Apr. 28, 2015

(86) PCT No.: PCT/DK2015/050109
§ 371 (c)(1),
(2) Date: Oct. 28, 2016

(87) PCT Pub. No.: WO2015/165473
PCT Pub. Date: Nov. 5, 2015

(65) Prior Publication Data
US 2017/0049072 A1    Feb. 23, 2017

(30) Foreign Application Priority Data
Apr. 29, 2014 (DK) ................................ 2014 70251

(51) Int. Cl.
*A01K 1/01* (2006.01)
*A01K 1/015* (2006.01)

(52) U.S. Cl.
CPC ................... *A01K 1/0155* (2013.01)

(58) Field of Classification Search
CPC ................... A01K 1/01; A01K 1/0155
USPC ........................................... 502/401
See application file for complete search history.

(56) References Cited

U.S. PATENT DOCUMENTS

| | | |
|---|---|---|
| 4,827,871 A | 5/1989 | Morrison |
| 5,271,355 A | 12/1993 | Bilings |
| 2008/0083376 A1 | 4/2008 | Hurwitz |
| 2011/0315088 A1 | 12/2011 | Yoder et al. |

OTHER PUBLICATIONS

International Search Report and Written Opinion for corresponding International Patent Application No. PCT/DK2015/050109, dated Jul. 8, 2015, 8 pages.

*Primary Examiner* — Edward M Johnson
(74) *Attorney, Agent, or Firm* — Merchang & Gould P.C.

(57) ABSTRACT

There is provided a composition suitable for use as poultry bedding based on wood shavings and *sphagnum*. The flow-flowing characteristic of the composition renders it very easy to apply and distribute on the floor of the stall. Moreover, the composition is easy to turn around and mix for the farmer. The composition exhibits effective absorption of ammonia for a complete production cycle for commercial poultry operations. A major effect of using the present composition is that foot burns and feet blisters of poultry observed with conventional bedding can essentially be avoided.

11 Claims, 1 Drawing Sheet

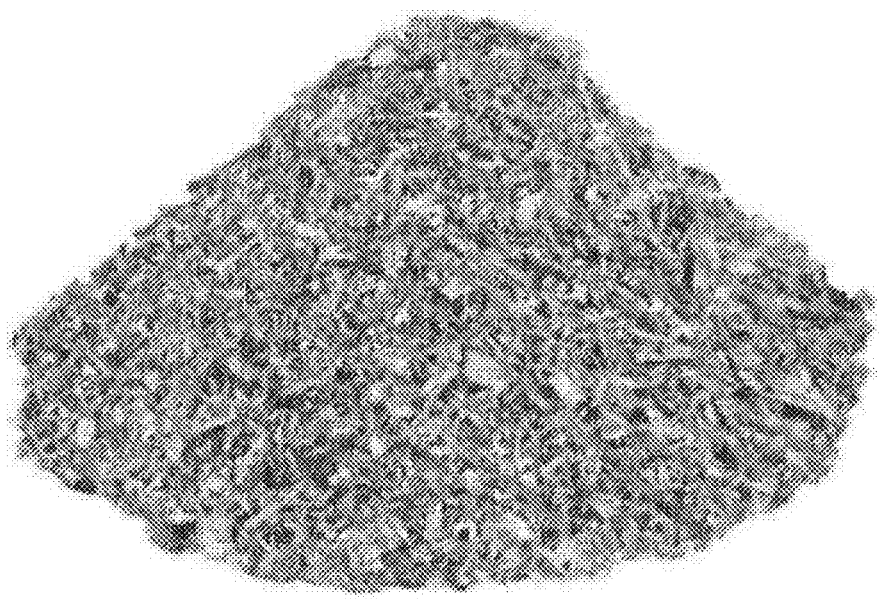

POULTRY BEDDING

This application is a National Stage Application of International Patent Application No. PCT/DK2015/050109, filed 28 Apr. 2015, which claims benefit of Serial No. PA 2014 70251, filed 29 Apr. 2014 in Denmark and which applications are incorporated herein by reference. To the extent appropriate, a claim of priority is made to each of the above disclosed applications.

FIELD OF THE INVENTION

This present invention relates to an improved product for use as poultry bedding based on wood shavings and *sphagnum*. By using the composition foot burns of poultry observed with conventional bedding can essentially be avoided.

BACKGROUND OF THE INVENTION

Wood shavings, sawdust, hulls, straw and a combination of these materials are widely used as poultry bedding. When used as bedding for poultry, these materials must serve two needs: absorbing moisture from the poultry droppings, and minimizing the release of gaseous ammonia.

Also blisters on the breasts of poultry may appear as poultry rub their breasts on the bedding as they stand from lying down positions. The wet bedding then promotes infection, thus down grading poultry final products. Existing bedding may also cause respiratory problems in poultry, which also down grade the quality of poultry final products.

Further, levels of ammonia in the barn increase as the grow progresses, to the point of burning eyes and throat of anyone entering barn. Such high levels of ammonia cause blindness in poultry, which limits mobility to feeders and inhibits growth. Also, these high levels of ammonia affect the overall health of poultry and promotes lung disease. Such an environment with high humidity and high ammonia levels affects overall health of poultry and increases the mortality rates in poultry.

Some additives have been proposed to attempt to deal with some of these problems. Those additives include clay additives to control ammonia. However, they are additives to existing bedding. The other disadvantages of existing bedding still remain. Accordingly, a different material is needed to make bedding. In particular, the additives deal only with ammonia and do not provide a remedy for the moisture related problems. Also, those additives usually last only for a few weeks.

It is known to use various sizes of whole wood pellets or crumbled wood pellets as kitty litter or other household pet bedding. Also, it is known to use wood pellets as bedding for horses. Wood pellets are capable of controlling odours. However, they are not suitable for use as bedding for poultry. Expelling ammonia and associated nitrates to the atmosphere is an environmental concern. Also, ammonia levels are a major concern relating to worker health.

Therefore, there is a need to provide bedding material which is suitable for use as bedding for poultry and which is capable of absorbing ammonia and odours for a period long enough to be used in a full production cycle in commercial poultry operations.

The above-mentioned commonly employed litter materials are effective to a degree. However, they have a tendency to compact, reducing their capacity to release moisture and increasing the formation and release of ammonia gas. To counter these problems, the litter can be regularly stirred, for example weekly. However, the stirring itself releases substantial amounts of ammonia, requiring increased air circulation through the poultry enclosure. In cold weather, the air must be heated, further increasing the production cost. Of course, the stirring operation itself is an added cost of labor.

It is an object of the present invention to provide a poultry bedding with improved aeration for a more stable, safer release of moisture and ammonia gases.

Another object is to provide a poultry litter which requires little or no periodic stirring to effect satisfactory moisture and ammonia release.

SUMMARY OF THE INVENTION

To achieve these and other objects, there is provided a composition suitable for use as poultry bedding, said composition comprising i) wood shavings obtained from pine or fir wood, said shavings having sizes within a range from 1-50 mm, preferably 5-20 mm, and ii) *sphagnum* of a light peat type, preferably with a pH of less than 6. Importantly the ratio of wood shavings and *sphagnum* ranges from 30/70% vol/vol to 80/20% vol/vol. The bulk density of the non-compacted composition is 100 to 250 kg/m3.

In a preferred embodiment of the present invention the ratio of wood shavings and *sphagnum* ranges from 30/70% vol/vol to 70/30% vol/vol. When properly mixed the composition is easy to apply and distribute on the floor. Moreover, it is easy to turn around and mix for the farmer.

The wood shavings have a specific particle size, dryness and density. By combing the wood shavings with *sphagnum* the product is capable of functioning as physical bedding for poultry providing effective absorption of ammonia for a complete production cycle for commercial poultry operations.

The size of the wood shavings is highly important to achieve the above discussed improvement over existing beddings. Hence, the product has been sieved several times in order to obtain an optimal absorption ability. Preferably, the nominal lenghts of the shavings are within a range from 1-50 mm and are preferably obtained from pine or fir wood. The preferred *sphagnum* is a light peat with a pH of less than 6.

In a second aspect the present invention there is provided a method for reducing ammonia levels in a poultry barn by applying on the floor 4-12 litres per m2, preferably 4-8 litres per m2, of the composition on the floor.

In a third aspect there is provided a novel use of a composition of the present invention for preventing foot burns of poultry.

In a fourth aspect the composition of the present invention is used for the therapeutic treatment, either curatively or preventively, of blisters on the feet of poultry. Especially when the composition is applied on the floor with 4-12 litres per m2, preferably 4-8 litres per m2, of the composition, it has surprisingly been found that foot burns can be almost avoided.

BRIEF DESCRIPTION OF THE DRAWING

The FIGURE shows a sample of the composition.

DETAILED DESCRIPTION OF THE INVENTION

The invention is in the following described in more detail.

The *sphagnum* used in the present invention may be any commercially available *sphagnum*. As used herein the term

*sphagnum* includes all species of living plants within the genus *sphagnum* whether naturally growing or cultivated. *Sphagnum* moss includes *sphagnum* that has been harvested, regardless of whether it has been subjected to further processing such as milling. *Sphagnum* peat moss includes partially decomposed *sphagnum* and/or partially decomposed *sphagnum* moss. Although the present invention prefers commercially available dried *sphagnum* moss, principles are considered to extend to *sphagnum* and *sphagnum* peat moss as well.

The wood shavings are obtained from soft wood. Examples of suitable woods include Ponderosa, Lodgepole Pine, Spruce and White/Alpine Fir. For example, a mixture of Ponderosa and Lodgepole Pine is suitably used together with a mixture of Spruce and White/Alpine Fir.

As appears from the FIGURE, the composition of the present invention may attain the typical form of a free flowing particle-based composition when properly mixed. This means that the composition is very easy to apply and to distribute on the floor of the stall. This also give improved aeration of the bedding.

In a comparative study the composition of the present invention showed a significant reduction of the foot burns in a chicken stock relative to a comparative stock held on normal poultry bedding.

In the comparative study a composition according to the present invention had 70% vol wood shavings and 30% vol *sphagnum* (with pH about 5), whereas the conventional poulry bedding was essentially based on wood chips. It has been speculated by the inventors why the present composition gives to an unexpectedly efficient removal of the ammonia than is normally observed with conventional poultry bedding. It appears that the size of the wood shavings in conjunction with the *sphagnum* constituents renders the bedding very spongy or aery and provides a large surface area of *sphagnum* that can absorb the ammonia. In any event it is very unexpected that such simple means results in an significant reduction in foot burns.

The invention claimed is:

1. A composition suitable for use as poultry bedding, said composition comprising:
   (a) wood shavings obtained from pine or fir wood, said shavings have sizes within a range from 1-50 mm;
   (b) *sphagnum* of a light peat type;
wherein the ratio of the wood shavings and the *sphagnum* ranges from 30/70% vol/vol to 80/20% vol/vol, and wherein the composition has a bulk density of 100 to 250 kg/m3, in a non-compacted state.

2. The composition of claim 1, wherein the ratio of the wood shavings and the *sphagnum* ranges from 30/70% vol/vol to 70/30% vol/vol.

3. A method of reducing ammonia levels in a poultry barn by applying on a floor 4-12 litres per $m^2$ of a composition according to claim 1.

4. The method according to claim 3, wherein 4-8 litres per $m^2$ of the composition is applied.

5. The method according to claim 3, wherein the composition is applied after the barn has been warmed to at least 30 degrees Celsius.

6. The composition of claim 1, wherein the shavings have sizes within a range of 5-20 mm.

7. The composition of claim 1, wherein the composition has a bulk density of 130 to 200 $kg/m^3$ in a non-compacted state.

8. The composition of claim 1, wherein the *sphagnum* has a pH of less than 6.

9. The method according to claim 3, wherein the composition is applied after the barn has been warmed to 34-35 degrees Celsius.

10. A method of using a composition according to claim 1 as bedding for preventing foot burn of poultry, the method comprising:
    applying and distributing on a floor the composition in a dosage of 4-12 litres per $m^2$.

11. The method according to claim 10, wherein the dosage of the composition is 4-8 litres per $m^2$.

* * * * *